United States Patent [19]

Gillett

[11] 3,919,610
[45] Nov. 11, 1975

[54] AC MOTOR SPEED CONTROL
[75] Inventor: Jimmie D. Gillett, Garland, Tex.
[73] Assignee: Unitron Incorporated, Garland, Tex.
[22] Filed: Nov. 13, 1974
[21] Appl. No.: 523,325

[52] U.S. Cl. ............. 318/231; 321/9 A; 318/227
[51] Int. Cl.² .................................. H02P 5/40
[58] Field of Search............. 318/171, 231, 227; 321/9 A

[56] References Cited
UNITED STATES PATENTS

| | | | |
|---|---|---|---|
| 3,538,420 | 11/1970 | Klein | 318/227 X |
| 3,697,843 | 10/1972 | Riess | 318/231 |
| 3,855,510 | 12/1974 | Houck | 318/231 |
| 3,859,585 | 1/1975 | Meier | 318/231 |

Primary Examiner—Benjamin Dobeck
Attorney, Agent, or Firm—Lerner, David, Littenberg & Samuel

[57] ABSTRACT

A system for generating drive signals for a three-phased motor is disclosed. The system includes an integrator driving a threshold circuit which together operate as a voltage control oscillator providing a triangular output waveform. Timing circuitry provides AC coupled signals to an input of the integrator to vary time intervals within the triangular output waveform. Additional circuitry is disclosed which adds the triangular output waveform to timing signals to provide a composite waveform. A comparator circuit is disclosed which compares the composite waveform with a DC reference speed determining signal which is also applied to the integrator. The output of the comparator circuit is combined with timing signals to provide drive signals for the three-phased induction motor.

10 Claims, 2 Drawing Figures

AC MOTOR SPEED CONTROL

FIELD OF THE INVENTION

This invention relates to AC motor drive circuitry and particularly to pulse width modulated AC motor drive circuitry.

BACKGROUND OF THE INVENTION

In many industrial applications, three-phase AC motors are less expensive and more reliable than DC motors. As is well known, however, the speed of a DC motor is more easily controllable than the speed of an AC motor.

It is well known that for a three-phased AC motor the frequency of the drive must be altered in order to alter the speed of the motor. It is also well known that in order to provide constant torque output from the motor, the amplitude of the drive signal must be reduced as the speed of the motor is reduced.

One system for providing drive signals to an AC motor is disclosed in U.S. Pat. No. 3,538,420 which issued Nov. 3, 1970 to F. N. Klein and is entitled IN-VERTER. In the Klein patent it is taught that a constant amplitude three-phase drive signal having variable frequency can be employed to drive a three-phase motor with constant torque by taking notches in successive 60° segments of each phase. Klein teaches one to employ three notches in each of the 60° segments. By varying the width of the notch in response to the fundamental frequency of the drive signal, the effective amplitude of the drive signal can be controlled. The Klein system generates the notches and widths thereof digitally and is programmed to employ three notches in each half cycle the widths of which are expanded and contracted together.

The Klein system is functional but suffers from the disadvantage that the energy distribution of the Klein waveform differs for different frequencies of fundamental frequency. For example, as the frequency gets lower and lower, the notches are more concentrated within the cycle of the drive signals rather than spreading the energy distribution throughout the waveform.

To overcome this and other problems I developed and offered for sale in the past, a system for supplying drive voltages to a three-phased motor in which a speed determining signal drove a time base generator for providing a time base signal having a uniform repetition rate for each value of the speed determining signal. The system had circuitry therein responsive to the time base signal for generating a composite waveform in which the amplitude of the composite waveform varied between different values in different portions thereof. The system further had a comparator for comparing the speed determining signal with the composite waveform for generating the drive voltages.

My prior system was in fact capable of driving a multi-phase motor but I found that when driving a motor requiring constant torque, there was difficulty at startup. I further found that when driving motors that were loaded with predetermined variable loads, the motor drive was not satisfactory.

BRIEF DESCRIPTION OF THE INVENTION

In order to overcome the disadvantages of the prior art (including my prior system), the present invention was developed. This invention is a device for supplying drive voltages, having a fundamental frequency controlled by a speed determining signal, to a multi-phase motor in which there is circuitry responsive to the speed determining signal for providing a time base signal having a first predetermined number of transitions for each cycle of the fundamental frequency, thereby providing a second predetermined number of time intervals within each of the cycles of said fundamental frequency. Circuitry is also provided which is responsive to the time base signal for generating a composite waveform in which the amplitude of the composite waveform in a first of the second predetermined number of time intervals varies between a first value and a second value and in a second of the second predetermined number of time intervals between a third value and a fourth value as well as circuitry responsive to the speed determining signal and the composite waveform for generating the drive signals. The device is characterized by circuitry for controlling the duration of the first of the second predetermined number of time intervals so that it is different than the second of the second predetermined number of time intervals.

For a motor which drives a load at constant torque, the device controls the duration of the first of the second predetermined number of time intervals so that the ratio of the difference between the first and second values to the first value is an integer multiple of the ratio of the duration of the first of the second predetermined number of time intervals to the duration of one sixth cycle of the fundamental frequency. In the preferred embodiment of this invention, the integer is 1.

The preferred embodiment also includes a voltage responsive oscillator responsive to the speed determining signal to serve as the circuitry for providing the time base signal. Circuitry is also provided which AC couples signals to the voltage responsive oscillator for controlling the duration of the first of the second predetermined number of time intervals without altering the average frequency of the time base signal.

DESCRIPTION OF THE DRAWINGS

For a more complete understanding of the invention, reference should be made to the following detailed description and drawings in which.

DETAILED DESCRIPTION OF THE INVENTION

Figure 1:
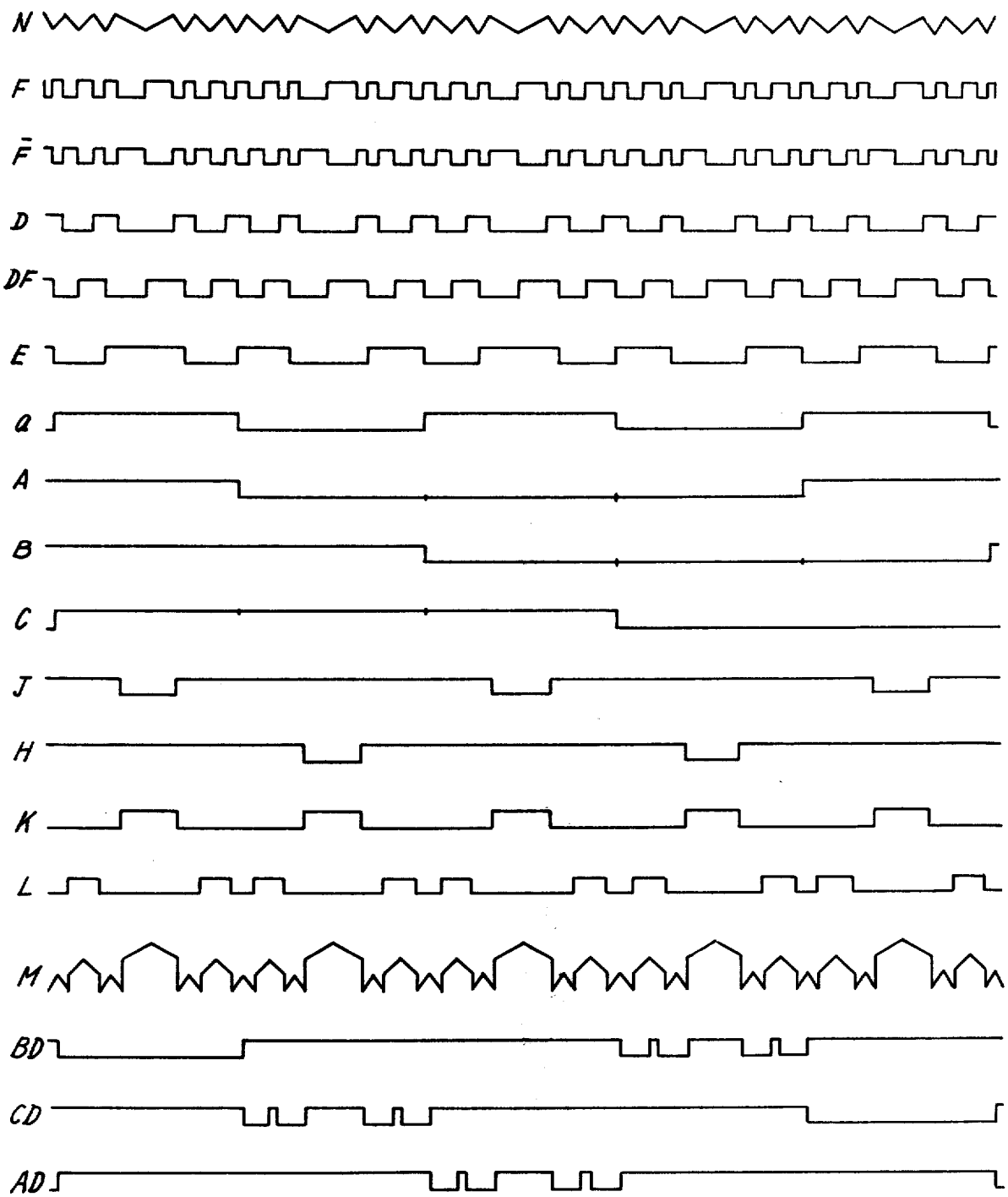
FIG. 1 is a waveform drawing showing waveforms at various locations in a device embodying the principles of this invention.
Figure 2:
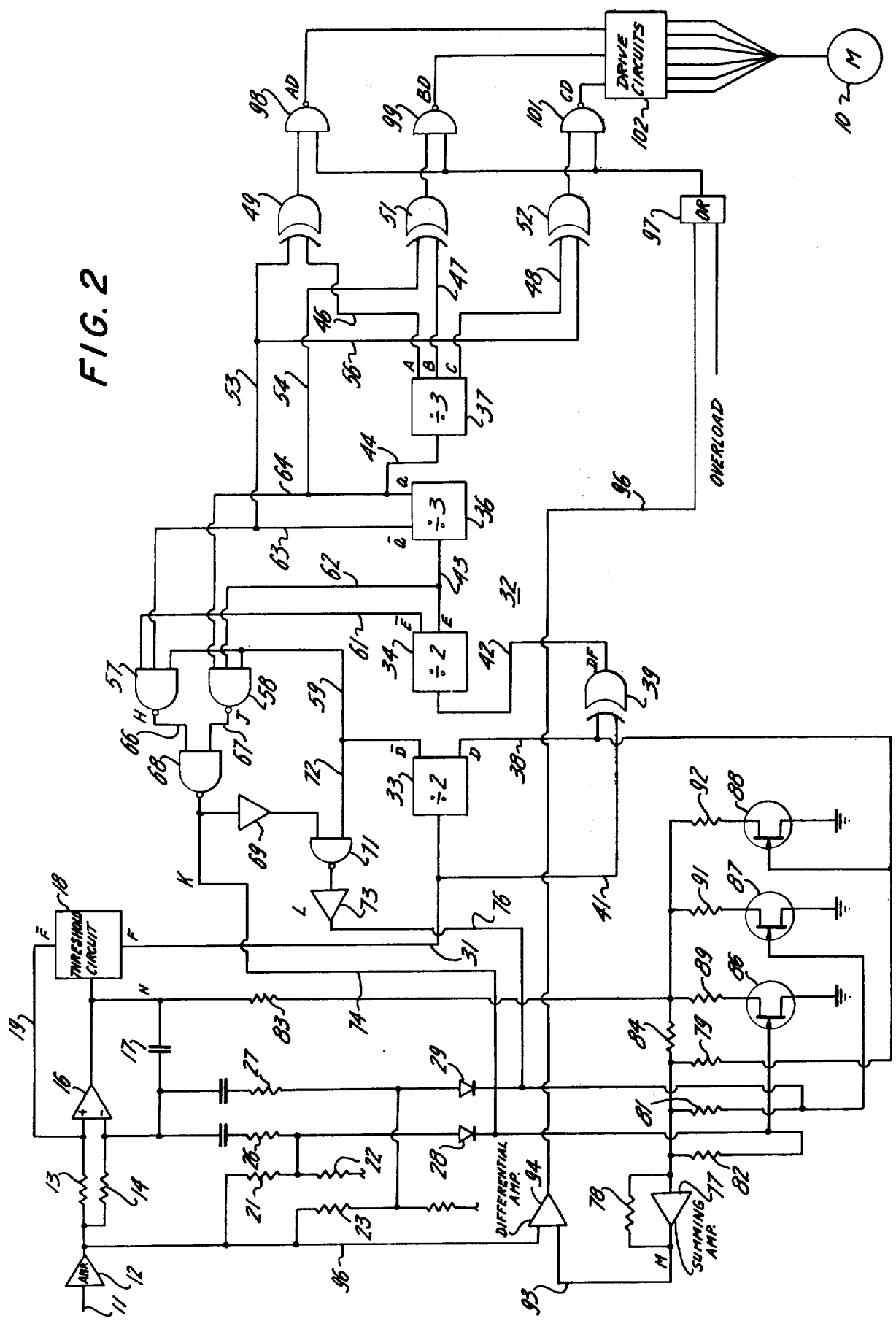
FIG. 2 is a schematic diagram, partially in block diagram form, showing a device which embodies the preferred embodiment of this invention.

Referring now to FIG. 1, we see three waveforms BD, CD and AD, each of which controls the current in one phase of a motor 10 seen in FIG. 2. It should be noted that only 60° of each half cycle of each of the above-referred to waveforms, is employed to effect the speed of the motor 10. It will be noted that pulse modulation appears in successive 60° segments of the waveforms BD, CD and AD, so that pulse modulation is always being applied to one phase of the drive currents driving motor 10. It has been found that in this way complete control of the speed of the motor can be obtained from zero speed to full speed.

The circuit shown in FIG. 2 generates the waveforms BD, CD and AD to provide control of the speed of the motor 10. A DC reference speed determining signal applied to a terminal 11 controls the circuit of FIG. 2 to develop the waveforms BD, CD and AD in accordance with the teachings of this invention to control the speed of the motor 10. The DC reference speed determining signal is amplified by an amplifier 12 and applied via resistors 13 and 14 to non-inverting and inverting inputs, respectively, of a high gain amplifier 16. The resistor 14 is twice the value of the resistor 13 so that one half the current that flows in resistor 13 flows in resistor 14. The high gain amplifier 16 has a capacitor 17 connected from the output thereof to the inverting input thereof so that the difference between the currents provided through the resistors 13 and 14 are integrated thereby. The output of the amplifier 16 is applied to a bi-directional threshold circuit 18. The bi-directional threshold circuit 18 provides a first output signal on an output terminal F when the input thereof is below a first value after having been below a second value and will provide a second output signal when the input thereof goes below the first value after having been above the second value. The complement of the signal on the output F is provided on an output $\bar{F}$ and applied via a lead 19 to the non-inverting input of the amplifier 16 to either clamp the non-inverting input to ground or not interfere with the operation thereof. It should be noted that the output of the threshold circuit 18 switches between a high and low impedance state to accomplish the function described above.

The combination of the integrator, including the amplifier 16 and feedback capacitor 17, driving the threshold circuit 18 which in turn controls the non-inverting input of the amplifier 16, provides a time base generator having an output signal appearing on the terminal N which varies between the first and second value as determined by the threshold circuit 18. This is a fixed amplitude signal. The fact that the value of the resistor 14 is twice that of resistor 13 insures that the slope of the signal N is the same for both positive and negative excursions since the same voltage is applied across both resistors 13 and 14. The time between transitions of the signal N is determined by the amplitude of the DC reference speed determining signal.

In accordance with the teachings of this invention the output of the amplifier 12 is also applied to a pair of low impedance voltage dividers including resistors 21 and 22 and 23 and 24, respectively. The outputs from these voltage dividers are fed back through RC networks 26 and 27 to vary the time between transitions of the waveform N in a predetermined pattern determined by timing signals applied via diodes 28 and 29, respectively, without varying the average number of transitions in the waveform N over a predetermined number of cycles thereof. The signal N and $\bar{F}$ are shown in FIG. 1 as well as many of the other signals developed by the circuitry of FIG. 2.

The F output signal from the threshold circuit 18 is employed as a time base signal for the circuit of FIG. 2. This signal is applied via lead 31 to a counting chain 32 including divide by two circuits 33 and 34 and divide by three circuits 36 and 37. The signal F applied by the lead 31 to the divide by two circuit 33 provides a pair of output signals D as shown in FIG. 1 and $\bar{D}$ which is the inverse thereof. The D signal is applied via lead 38 to an exclusive OR circuit 39 while the signal F is applied via lead 41 to the exclusive OR circuit 39. The output of the exclusive OR circuit 39 is a signal DF (see FIG. 1) which is the signal D phase-shifted by 90°. The DF signal is applied via lead 42 to the divide by two circuit 34 which provides a signal E (see FIG. 1) and a signal $\bar{E}$ which is the inverse thereof.

The signal E is applied via lead 43 to the divide by three circuit 36. The divide by three circuits 36 and 37 are circuits which provide an output for every one and half cycles applied at the input thereof. Circuits like these are not as commonly used as the standard divide by two circuits but are well known in the art. The output of the divide by three circuit 36 is a signal $a$ and the inverse thereof $\bar{a}$. The signal $a$ is applied via lead 44 to the divide by three circuit 37 which provides three signals A, B, and C. The signals A, B and C, as well as $a$ are seen in FIG. 1.

The signals A, B and C are applied via leads 46, 47 and 48 to exclusive OR circuits 49, 51 and 52, respectively. The other input of each of the exclusive OR circuits 49, 51 and 52 have the signal $a$ or $\bar{a}$ applied thereto via leads 53, 54 and 56. The output of the exclusive OR circuits 49, 51 and 52 are squarewaves having the frequency and phase of the signals A, B and C with successive 60° segments thereof notched out.

The outputs of the circuits 33, 34 and 36 are also employed to generate timing signals L and K (see FIG. 1). The timing signal K defines the center of each 60° segment of the signals A, B and C. The signal L provides a pair of equally spaced pulses between each of the K pulses. The signal D provides pulses interspersed between each of the pulses which would be formed by a composite of the signals K and L. The signal K is developed by employing two NAND gates 57 and 58 to which the signals $\bar{D}$, $\bar{E}$, E, $\bar{a}$ and $a$ are provided via leads 59, 61, 62, 63 and 64, respectively. The NAND gates 57 and 58 provide the signals H and J shown in FIG. 1. The signals H and J are applied via leads 66 and 67 to a NAND gate 68 to provide the signal K on the output thereof. The signal L is generated by inverting the signal K in an inverted amplifier 69 and applying the output thereof to a NAND gate 71. The signal $\bar{D}$ is also applied to the NAND gate 71 via lead 72. The output of the NAND gate 71 is inverted by an inverting amplifier 73 to provide the signal L.

The signal K is applied via lead 74 to the diode 28 to unclamp the voltage divider including resistors 21 and 22 to provide a predetermined charge to the integrator formed by the amplifier 16 and capacitor 17 via the network 26. In this way a predetermined change in the timing of the integrator is accomplished during the period of the K pulse making the K pulse longer in duration than the remaining pulses. In a like manner the L signal is applied via lead 76 to the diode 29 to in a like fashion unclamp the voltage divider formed by the resistors 23 and 24 to increase the duration of the period of the integrator formed by the amplifier 16 and capacitor 17 during the L interval. No modification is made to the integrator during the D interval and therefore the timing thereof remains as determined by the integrator and threshold circuit 18.

In accordance with the teachings of this invention, a composite waveform M (see FIG. 1) is developed at the output of a summing amplifier 77 which includes a feedback resistor 78 by selectively applying currents to the amplifier 77 during each of the intervals determined by the signals D, L and K to provide predetermined amplitude signal levels in the composite waveform M during the respective pulse intervals. The D signal drives the resistor 79, the L signal drives the resistor 81 while the K signal drives the resistor 82. The signal N is fed through resistors 83 and 84 to the amplifier 77 to provide the triangular waveforms thereof riding on top of the signal levels provided during the various intervals by resistors 79, 81 and 82. Three field effect transistors 86, 87 and 88 are employed to tailor the amplitude of the waveform N during each of the intervals D, L and K. To this end, resistor 89, 91 and 92 are switched by the field effect transistors 86, 87 and 88 in response to the signals K, L and D, respectively, to load down the voltage divider formed by the resistors 83 and 84.

In accordance with the specific embodiment of this invention, the signal level added during the interval defined by the pulses in the signal D is zero. The signal level added during the interval defined by the pulses in the signal L is equal to the maximum aplitude of the signal N while the signal level added during the interval defined by the pulses in the signal K is twice the maximum amplitude of the signal N. The duration of the various intervals are adjusted (via resistors 21, 22, 23 and 24, as well as the networks 26 and 27) so that the pulses during the signal K occur during one third of the time. Each of the pulses occurring during the signal L are one half the duration of the pulses occurring during the signal K. The pulses occurring during the signal D have one third the duration of the pulses occurring in the signal K.

The signal M is applied via lead 93 to a high gain differential amplifier 94. The signal at the output of the amplifier 12 (the speed-determining signal) is applied via lead 96 as a second input to the differential amplifier 94. The differential amplifier 94 provides a limited output (either one of two states) depending upon the relative magnitudes of the two signals applied thereto. Therefore, it can be seen that at maximum speed, when the speed-determining signal is equal to the maximum amplitude of the signal M and the signals BD, CD and AD are at their highest frequency, the output of the amplifier 94 is always at its maximum. This defines a voltsecond relationship in the motor drive signals (BD, CD and AD) for a specific torque. As the speed-determining signal decreases (lowering the ultimate drive frequency of the motor 10) the output of the amplifier 94 develops a single pulse in the center of each 60° segment as the speed-determining signal intersects the peak of the composite waveform in the area defined by the M pulse. As the speed-determining signal decreases (thereby lowering the frequency of the motor drive signals as well) the width of the pulse developed at the output of the differential amplifier 94 increases. In accordance with the teachings of this invention, the triangular waveform on top of the K portion of the M waveform is one third the amplitude thereof, while the time duration thereof is also one third thereof. Therefore, as the speed-determining signal lowers the motor drive frequency by one third, the intersection of the speed-determining signal and the composite signal M provides a pulse which varies from zero to one third of the time duration. As the speed-determining signal lowers itself further (and thereby continues to lower the frequency of the motor drive signals) the speed-determining signal next intersects portions of the M signal defined by the L pulses. In a like fashion additional pulses developed in the output of the differential amplifier 94 noted that at this point additional symmetric pulses are being added at a very narrow width so that if the speed-determining signal varies slightly about the transition point from the K portion to the L portion of the composite signal M, only a very narrow pulse is introduced. As the speed-determining signal lowers further the width of the additional pulse becomes greater. In this way the voltsecond relationship of the drive signal is maintained constant (or can be tailored to a known characteristic) while still maintaining a somewhat smooth energy distribution within the drive signals. It should be understood further that as the signal drops to the D region additional pulses are added which introduce additional energy distribution at much lower frequencies. The same advantage occurs of lack of difficulty around transitions. In digital systems such as Klein, if additional pulses are added at fixed relative widths, a transition would be abrupt in the energy distribution of the overral waveform. The change in amplitude of the M composite signal during the L period is the same as it was for the K period. Therefore, the L pulses are half the width of the M pulse since there are two of them. In a like fashion, the change in amplitude of the M signal during the D region is equal to the change during each of the other two intervals and therefore the width of the D pulses are one third of the A to maintain the constant voltsecond relationship in the ultimate drive signals. The M signal is applied via lead 96 to an OR gate 97 which drives one input of each of the NAND gates 98, 99 and 101. The outputs of the exclusive OR circuits 49, 51 and 52 drive the other input respectively of the OR gates 98, 99 and 101, thereby providing the signals AD, BD, and CD (see FIG. 1) to motor drive signal developing circuits 102, the drive circuits 102, tailor the signals provided thereto to provide appropriate delays for turn-on and turn-off as is well known in the art. The drive circuits 102 drive the motor 10 in accordance with the teachings of this invention.

It should be understood that while this invention has been described with respect to a particular embodiment thereof, numerous others will become obvious to those of ordinary skill in the art in light thereof.

What is claimed is:

1. In a device for supplying drive voltages, having a fundamental frequency controlled by a speed determining signal, to a multi-phase motor:

means responsive to said speed determining signal for providing a time base signal having a first predetermined number of transitions for each cycle of said fundamental frequency, thereby providing a second predetermined number of time intervals within each of said cycles of said fundamental frequency;

means responsive to said time base signal for generating a composite waveform in which the amplitude of said composite waveform in a first of said second predetermined number of time intervals varies between a first value and a second value and in a second of said second predetermined number of time intervals between a third value and a fourth value; and means responsive to said speed determining signal and said composite waveform for generating said drive voltage;

the improvement comprising:

means for controlling the duration of said first of said second predetermined number of time intervals to be different than said second of said second predetermined number of time intervals.

2. In the device defined in claim 1 in which said means for controlling the duration of said first of said second predetermined number of time intervals controls the duration of said first of said second predetermined number of time intervals so that the ratio of the difference between said first and second values to said first value is an integer multiple of the ratio of said duration of said first of said second predetermined number of time intervals to the duration of 1/6 cycle of said fundamental frequency.

3. In the device as defined in claim 2 in which said integer is 1.

4. In the device as defined in claim 2 in which said second value is equal to said third value.

5. In the device as defined in claim 4 in which the amplitude of said composite waveform in a third of said second predetermined number of time intervals varies between said third value and said fourth value and the time duration of the sum of said second and third of said second predetermined number of time intervals equals the duration of said first of said second predetermined number of time intervals.

6. In the device as defined in claim 5 in which the difference between said first and second values is equal to the difference between said third and fourth values.

7. In the device as defined in claim 6 in which said whole number is 1.

8. In the device as defined in claim 1 in which said means for providing a time base signal is a control signal responsive oscillator circuit and said means for controlling the duration of said first of said second predetermined number of time intervals includes means for AC coupling a control signal to said oscillator circuit during said first of said second predetermined number of time intervals.

9. In the device as defined in claim 8 in which said oscillator circuit provides a triangular waveform having a fixed amplitude.

10. In the device as defined in claim 9 in which said oscillator circuit includes an integrator and a level sensing circuit.

* * * * *